United States Patent [19]

Brown et al.

[11] 4,018,322

[45] Apr. 19, 1977

[54] GIMBALED CONVEYOR BALLS

[75] Inventors: Elwood B. Brown, Cedarburg; Helmut H. Kropp, Pewaukee, both of Wis.

[73] Assignee: Rexnord Inc., Milwaukee, Wis.

[22] Filed: June 11, 1976

[21] Appl. No.: 695,280

[52] U.S. Cl. .............................. 193/37; 193/35 MD
[51] Int. Cl.[2] ......................................... B65G 39/02
[58] Field of Search ............ 193/35 R, 35 MD, 36, 193/37; 198/780, 787

[56] References Cited

UNITED STATES PATENTS 3,976,177  8/1976  Brown ...................... 193/35 MD X

*Primary Examiner*—Evon C. Blunk
*Assistant Examiner*—James L. Rowland

[57] ABSTRACT

Apparatus for the omni-directional movement of objects over a surface which includes a plurality of rotatable elements mounted between adjacent, parallel support members. The rotatable elements comprise a gimbaled ring mounted for rotation to the adjacent supports, a central disc rotatably mounted to the ring along an axis of rotation of the ring, and a plurality of lobes rotatably mounted to the central disc having axis of rotation equally distributed in a common plane and perpendicular to the rotational axis of the central disk. Associated with each rotatable element is a means which restricts the rotation of the gimbaled ring.

8 Claims, 10 Drawing Figures

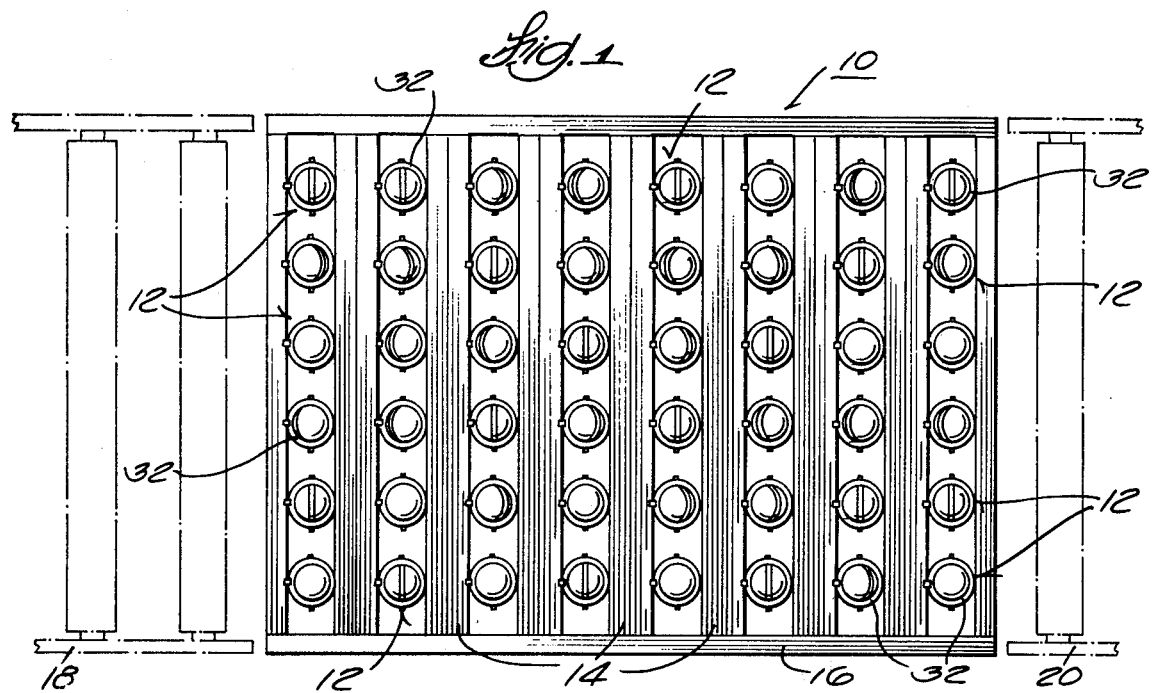
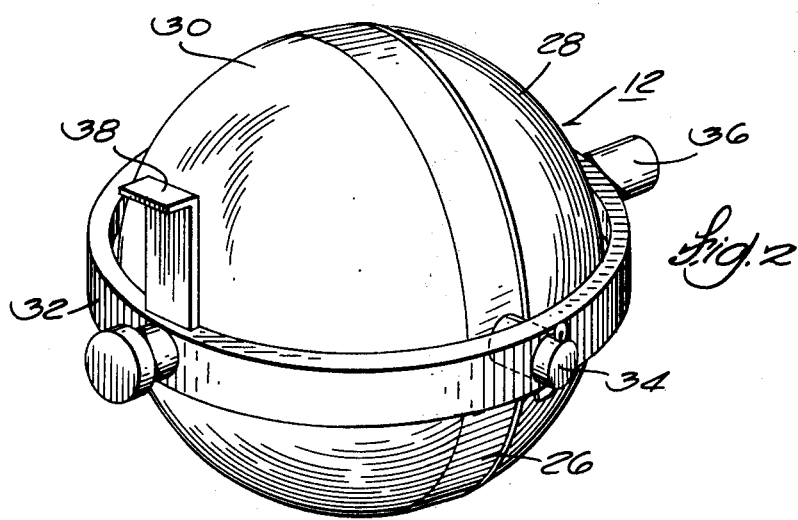
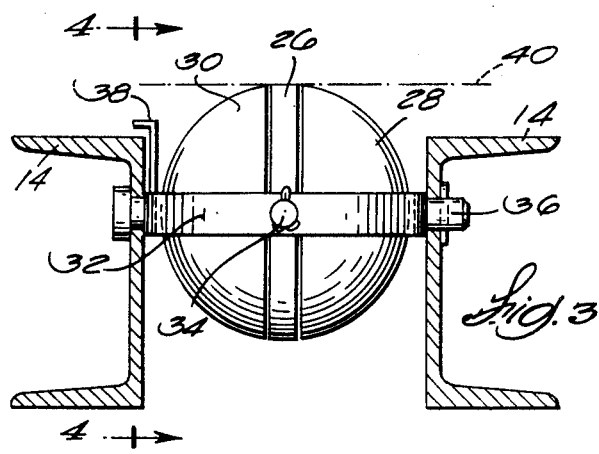
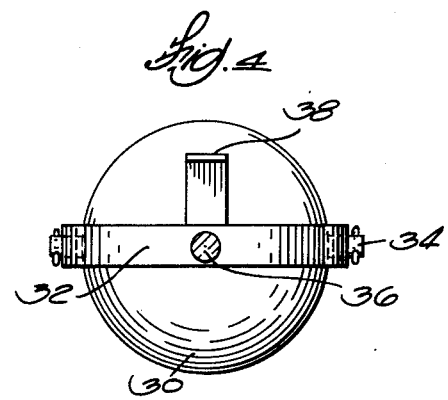

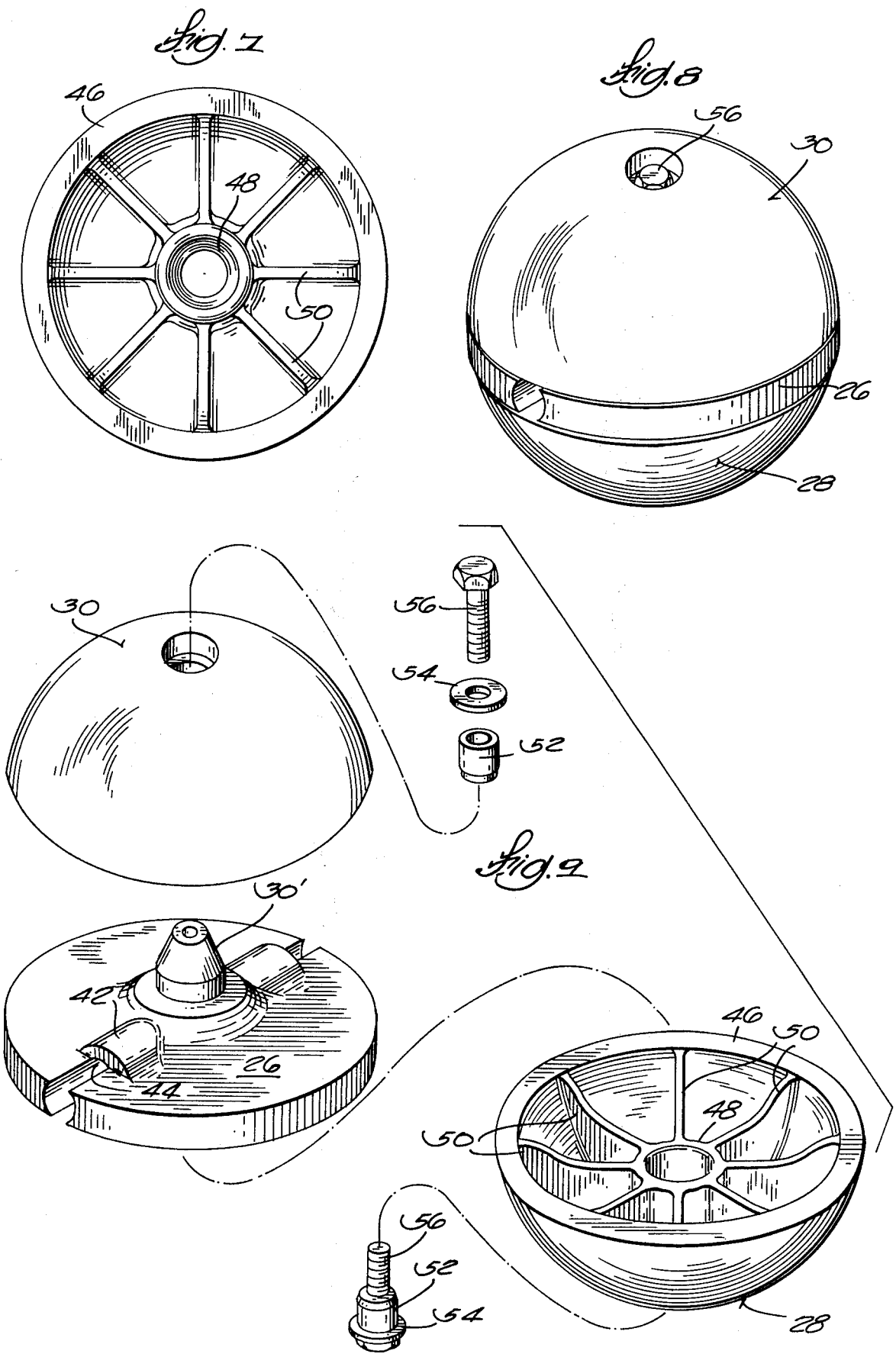

GIMBALED CONVEYOR BALLS

BACKGROUND OF THE INVENTION

1. Related Inventions

This application is related to U.S. Pat. No. 3,804,230 and co-pending application Ser. No. 552,816, now U.S. Pat. No. 3,976,177, both of which are assigned to the same assignee as the present invention. The invention is further related to apparatus for the movement of objects across its surface and more specifically, to apparatus which permit omni-directional movement of the objects in a plane defined by the surface of the apparatus.

2. Discussion of the Prior and Related Art

The referenced U.S. Pat. No. 3,804,230 describes and claims a commercially suitable apparatus having a plurality of powered rollers with drive wheels mounted in a helix on the periphery of the roller. The drive wheels comprise in part a surface upon which an object such as a pallet may be moved. As the roller is caused to rotate by an appropriate driving means, the wheels power the pallet in the direction of roller rotation. Right angle transfer can be accomplished by maintaining the roller stationary, but powering the wheels are mechanically coupled to the driving means. Clockwise or counterclockwise motion can also be accomplished through appropriate control of individual rollers.

Intermediate the rollers, a plurality of independently rotatable nonpowered elements may be positioned to provide further support for the pallet. The referenced U.S. application Ser. No. 552,816, U.S. Pat. No. 3,976,177, describes and claims a element which is particularly suitable and advantageous for this use. Briefly, the element is comprised of an axle member which defines a central axis and is rotatably mounted between a pair of support members. A plurality of lobes are individually rotatably mounted and secured to the axle member. The axis of the lobes together define a plane perpendicular to the central axis and arranged symmetrically about the central axis. In the specific case of a two lobed element, the angle between lobe axis is 180°. In a three lobed element, the angle between adjacent lobe axis would be 120°.

The lobe surface is curved and constitutes a portion of an imaginary spherical surface. The total surface of all lobes of any particular element comprises a substantially spherical surface, permitting space sufficient between adjacent lobes to permit independent rotation. The spherical surface projects above the adjacent support members to provide a load surface for the pallets.

3. The Problem

Movement of objects on a surface defined by a plane commonly tangent to the imaginary spheres formed by the plurality of the rotatable elements is substantially omni-directional. Friction in the apparatus is substantially reduced to bearing and rolling friction. The single exception is where a particular element is positioned such that when the vector of a force applied to it by movement of the pallet is in a plane defined by the axis of the contacted lobe and axis of the axle member. This position of the element is called its "dead spot position".

Generally, the dead spot position causes no problem since the probability of an element being in this position is statistically small and neglible in effect where a large number of elements are used. In powered applications, where the elements serve as intermediate support surfaces between powered rollers, the effect of dead spot positioning is essentially minimal. There are instances, however, where it would be desireable to eliminate dead spot positioning. For example, use of rotatable elements in nonpowered applications dictate that the manual energy requirements be low. When experiencing heavy loads pallets having surface characteristics such that the coefficient of friction between pallet and the stationary lobe surface is high, it has been noted that manual movement becomes more difficult. This may become particularly evident when the number of elements supporting a heavy load is small. The wear on lobe and pallet surface in such instances becomes more pronounced.

It was with this problem in mind that applicants determined that the paramount object was to develop an apparatus which would substantially reduce the effect of dead spot positioning. The following summary demonstrates that the objective was met.

SUMMARY OF THE PRESENT INVENTION

The apparatus of the present invention comprises in part a frame and a plurality of parallel spaced support members secured to the frame. A plurality of rotatable elements are mounted between adjacent support members and provide a support surface for objects being moved over the apparatus. Each of the elements comprise a first member rotatably mounted to the adjacent members along an axis substantially perpendicular to the length of the support members in the parallel direction. A central member is rotatably mounted to said first member along a second axis lying in the same plane as the first axis. A plurality of lobes are individually rotatably mounted to the central member about axis all perpendicular to said second axis. Associated with each rotatable element is a means which restricts rotation of the first member to an arc extending a predetermined angle above and below a plane defined by the first axis of said plurality of rotatable elements.

Other advantages and objects of the present invention will become apparent after a reading of the description and appended drawings.

BRIEF DESCRIPTION OF THE DRAWINGS

FIG. 1 is a plan view of an apparatus having an array of gimbaled elements disposed between two conveyor sections.

FIG. 2 is a perspective view of one of the gimbaled elements.

FIG. 3 is a view of an element similar to that in FIG. 2 where the element is supported by cross members.

FIG. 4 is a view taken along lines 4—4 of FIG. 3.

FIG. 7 is a view into the inside of one of the lobes

FIG. 8 is a perspective view of a two-lobed conveyor element which may be employed with the present invention.

FIG. 9 is an exploded perspective view of a two-lobed conveyor element.

DETAILED DESCRIPTION OF A PREFERRED EMBODIMENT

Figure 5:
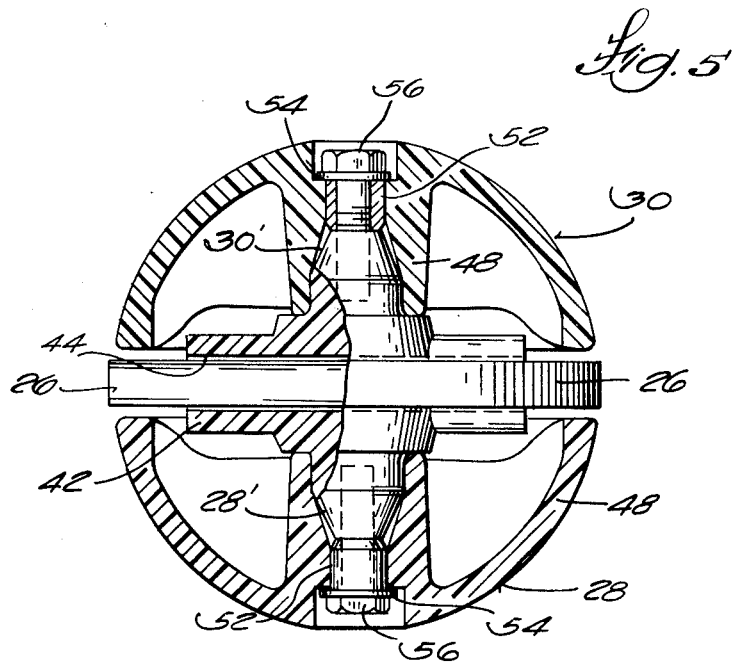
FIG. 5 is a cross-sectional view, partially broken away, taken through the center of the conveyor element.
Figure 6:
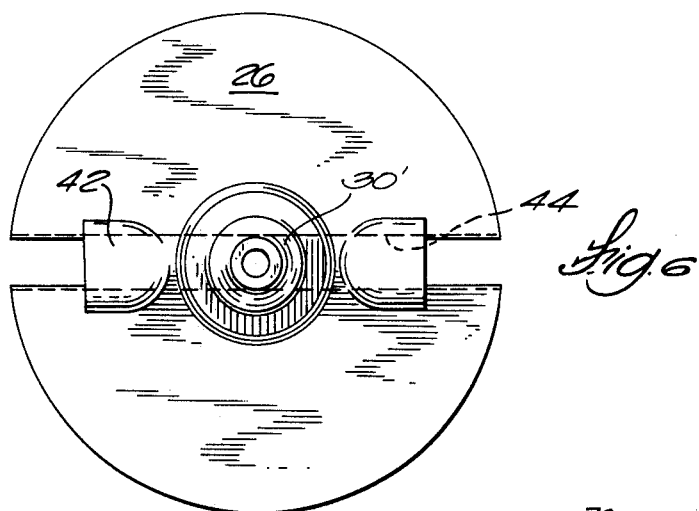
FIG. 6 is a plan view of an integrally formed subassembly comprising the lobe axles, the spacer disc, and the hub.

FIG. 1 depicts a transfer station 10 which generally comprises a plurality of conveyor elements 12 mounted between corresponding cross-members 14 secured to a frame structure 16. The conveyor elements 12 may be typically two-lobed conveyor balls as set forth in application Ser. No. 552,816, now U.S. Pat. No. 3,976,177.

Transfer station 10 is positioned between a pair of conveyor lines 18 and 20. The conveyor lines 18 and 20 may comprise conventional conveyor rollers 22, which can be powered as set forth in referenced U.S. Pat. No. 3,804,230, or free-turning as desired. Objects such as a pallet which move onto the transfer station from either conveyor line 18 or 20 may be freely slid in any direction once positioned on the transfer station 10, as indicated by the crossed arrows 24 in the middle of FIG. 1. As will be described in detail hereinafter, the lobes are independently rotatable, permitting the surface of each lobe to rotate with objects being passed over the conveyor elements which define a surface of the transfer station 10.

To describe various aspects of the improvement, reference is first made to FIG. 2 which depicts in perspective a single conveyor element 12. As illustrated, element 12 comprises a plurality of lobes herein shown as a pair of lobes 28 and 30 rotatably mounted to a spacer disc 26 via axles 28' and 30' (best seen in FIG. 5). Spacer disc 26 itself is mounted upon axle 34 to gimbaled ring 32, permitting independent rotation of the subassembly comprising lobes 28, 30 and spacer disc 26 independently of ring 32. Ring 32 as seen in FIG. 3 is mounted for rotation about an axis defined by axle 36 which is journalled into spaced cross-members 14. A limiting arm 38 integrally attached to ring 32 above axle 34 extends upward and then outward over adjacent cross-member 14. The positioning of arm 38 can best be seen in FIGS. 2 and 4.

Dashed lines 40 in FIG. 3 represent the surface presented by a plurality of conveyor elements 12 to support objects such as a pallet. Although it is shown that the radius of spacer disc 26 is equal to that of hemispherical lobes 28, 30, it should be understood that the radius of spacer disc 26 may be any value less than the radius of the lobes. While the periphery spacer disc 26 is shown to be circular, it could also have a multi-sided configuration if desired.

The structure of a two-lobed conveyor element may be best understood from FIG. 5. As shown therein, the conveyor element comprises a spacer disc 26 with a hub 42 having a hole 44 therethrough adapted to receive axle 34 as shown in FIGS. 2, 3, and 4. Hub 42 is also adapted to receive axles 28' and 30' which are coaxially mounted on the hub 42 at right angles to the axis thereof and on the opposite sides thereof, lobes 28, 30 which are rotatably mounted respectively on axles 28' and 30'. Spacer disc 26 (best seen in FIG. 8) is mounted on the hub 42, extends between lobes 28, 30, and fills the gap between the outer surfaces of lobes 28 and 30, thereby preventing objects or material being passed over the conveyor element during use thereof from getting caught between lobes 30 and 32.

The spacer disc 26, axles 28' and 30' and the hub 42 are preferably formed integrally, as shown in FIG. 5. Preferably each is formed of a plastic material having a low coefficient of friction, since the lobes 28 and 30 rotate respectively on axles 28' and 30'. Axle 34 preferably rotates in hole 44, which extends through the spacer disc 26 as well as hub 42, as may best be seen in FIG. 9. As previously stated the axle 34 preferably rotates in hole 44. To facilitate such rotation, the surface of the hole 44 constitutes a bearing adapted to permit the axle 34 to rotate therewithin. Alternatively, the axles 34 may be press fit into hub 42 and the spacer disc 26, in which case the bearing surface for rotation about the axis of axles 34 is located within the hole in ring 32 as shown in FIG. 2.

As depicted in FIGS. 5 and 7, the lobes 28 and 30 comprise a generally hemispherical wall 46 having a thickness much less than the radius thereof, a centrally and radially mounted bearing 48 depending from the inner surface of the wall 46, and a plurality of reinforcing webs 50 extending radially from the outer surface of the bearing 48 to the inner surface of wall 46. As shown in FIG. 5, each bearing 48 is shaped to receive the associated one of the axles 28 and 30, and each reinforcing web is cut away to clear the hub 42, which does not extend to the inner surface of the wall 46.

It is understood, however, that the particular construction of the lobes and mounts is described only for the sake of clarity and should not be construed as limiting in any manner. For example, lobes which are solid or made of metallic or other materials may be substituted for the described ones. Additionally, ball or roller bearings may be substituted for the depicted plain bearings.

The lobes 28 and 30, which come into direct contact with objects being rolled over the conveyor ball, are also preferably formed of a plastic material having a high surface toughness. On the other hand, the bearings 48, which are preferably formed integrally with the lobe walls 46 must rotate easily on axles 28' and 30', so the lobes 28 and 30 are preferably formed of a plastic material having a low coefficient of friction such as that which forms 28', 30'. One plastic material which fills both of these conditions is that sold under the trademark ACETAL.

FIG. 9, which is an exploded perspective view of the parts of a conveyor element which may comprise part of this invention, indicates how such a conveyor element may be assembled. While the lobes 28 and 30 could, of course, be mounted on axles 28' and 30' without a break in the surface of the lobes, they are conveniently mounted on the axles 28' and 30' by bearings 52, washers 54, and self-tapping plastic screws 56.

Figure 10:
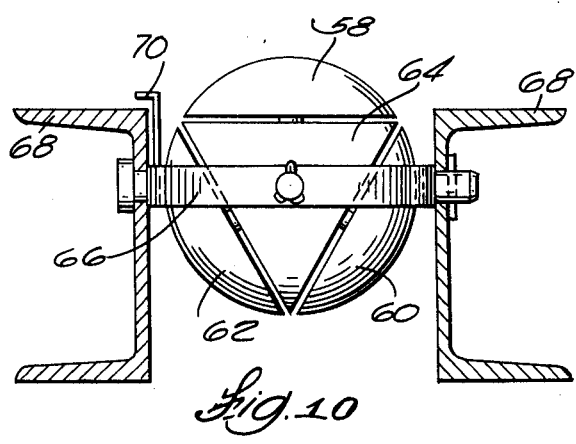
FIG. 10 is a view of a three-lobed conveyor element which may be used with the present invention.

While it is preferable to employ the two-lobed conveyor element as described hereinbefore, it is to be understood that other lobe configurations may be employed as well. For example, FIG. 10 illustrates a multi-lobed conveyor element which may be employed with the gimbaled ring of this invention. As shown in FIG. 10 lobes 58, 60, and 62 are rotatably mounted to a central member 64 having a triangular cross-section. As before, each lobe is independently rotatable. The central member 64 is also rotatably mounted to ring 66 appropriately journalled for rotatable movement about cross-members 68, thereby permitting rotation of the subassembly comprising member 64 and lobes 58, 60 and 62 independent of ring 66. Secured to ring 66 is a limiting arm 70.

Referring now to the operation of the preferred embodiment of the present invention, that is, a conveyor element having two hemispherical lobes, the surface of the conveyor element will ordinarily rotate about two independent, orthogonal axles. The first axle is defined by axle 34 and the second axle is defined by axles 28' and 30'. Thus, objects being slid over the conveyor ball will cause the surface of the conveyor ball to rotate along with them unless the vector of a force applied to it is in a plane defined by axles 28', 30' and axle 34. As may be seen from the cursory review of FIGS. 2 and 3, this event occurs when axles 28' and 30' are in a vertical position. However, because the axle 36 of the gimbaled ring is substantially perpendicular to this plane, the force will cause the gimbaled ring to rotate to a point where upright arm 38 contacts adjacent cross-support member 14.

While the amount of rotation of ring 32 is not critical, it is preferred to limit rotation of ring 32 beyond about 10°, generally less than about 5°.

Once gimbaled ring 32 has rotated, the point of contact on the surface of the lobe with the force is displaced providing a new point of contact which has a movement arm about the axis defined by axles 28' and 30'. This creates an unstable condition on the surface of the lobe, causing it to rotate about either axle 34 or the axle of the corresponding lobe. Theoretically, if the axle of the gimbaled ring is perpendicular to the defined plane, no further rotation will take place once arm 38 contacts the adjacent support member 14. Practically, however, this will not occur because of the ever-present small deviations in the manufacturing process making it impossible to get perfectly perpendicular axes.

The operation above is more or less identical to multi-lobed elements such as depicted in FIG. 10. As seen therein, the dead spot occurs when the vector of force is perpendicular to the plane of the paper and tangent to lobe 58. In other words, the direction of the force is in a plane defined by both the axis of lobe 58 and member 64. Again, ring 66 will rotate until arm 70 contacts cross-member 68. The unstable condition will cause the sub-assembly to rotate such that the force is no longer in the defined plane.

We claim:

1. Apparatus for the omni-directional movement of objects over the surface of the apparatus comprising
   a. a frame;
   b. a plurality of substantially parallel, spaced support members secured to said frame; and
   c. a plurality of conveyor elements mounted between said support members and providing a support surface for objects being moved over the apparatus, each of said elements comprising
      i. first means rotatably mounted to adjacent support members along a first axis substantially perpendicular to the parallel length of the support members,
      ii. a hub member rotatably mounted to said element along a second axis lying in approximately the same plane as the first axis,
      iii. a plurality of lobes each rotatably mounted to said hub for rotation about a third axis all perpendicular to said second axis, and
      iv. second means associated with each first means for restricting rotation of said first means to a predetermined degree of rotation above and below a plane defined by the first axis of said plurality of conveyor elements.

2. The apparatus of claim 1 in which said second means comprises an arm mounted adjacent the first axis for rotation with said first means, said arm adapted to contact an adjacent support member when said first means is rotated a predetermined angle from its horizontal position thereby preventing further rotation of said first means.

3. The apparatus of claim 1 in which said first means comprises a substantially circular ring, said hub member and lobes mounted for rotation within the surface of the spherical extension of said ring.

4. The apparatus of claim 3 wherein said second means comprises on upward extending arm secured to said ring adjacent the first axis, said arm adapted to contact an adjacent support member when said ring is rotated a predetermined angle from its horizontal position.

5. The apparatus of claim 4 wherein said conveyor element has two substantially hemispherical lobes rotatably mounted to a substantially disc-like hub, each of said lobes having a radius of curvature greater than length of said arm.

6. An improved lobed conveyor ball including a hub having a hole therethrough which defines a first axis and which is adapted to receive a first axle, a plurality of lobes rotatably mounted on said hub about an equal number of second axes individually associated with a lobe, said second axes all lying in a plane perpendicular to the first axis, each of said lobes being circular in cross-section perpendicular to their respective axes of rotation, the improvement comprising a curved member rotatably supporting said hub and having a radius of curvature slightly greater than that of the lobes said curved member having a first pair of holes lying along said first axis and adapted to receive the first axle, and having a second pair of holes lying along a second axis, each of which is adapted to receive a support axle, said first axis and second axis lying in the same plane.

7. The conveyor ball of claim 6 wherein said curved member is a substantially circular ring mounted for rotation about said second axis.

8. The conveyor ball of claim 7 wherein said conveyor ball has two substantially hemispherical lobes rotatably mounted to a substantially disc-like hub, said lobes having a center substantially coinciding with the center of the ring, each of said lobes having a radius smaller than the radius of said ring.

* * * * *